United States Patent
Aldrich, III et al.

(10) Patent No.: US 7,703,563 B2
(45) Date of Patent: Apr. 27, 2010

(54) CONTROL OF HYBRID POWER REGENERATION DURING CRUISE CONTROL

(75) Inventors: William L. Aldrich, III, Davisburg, MI (US); Donald D. Crites, Washington, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 160 days.

(21) Appl. No.: 11/824,774

(22) Filed: Jul. 2, 2007

(65) Prior Publication Data

US 2009/0008172 A1     Jan. 8, 2009

(51) Int. Cl.
*B60W 10/00* (2006.01)

(52) U.S. Cl. .............. 180/65.265; 180/65.21; 701/22

(58) Field of Classification Search ............. 180/65.3, 180/65.2, 65.4, 65.8, 65.21, 65.265, 65.27, 180/65.275, 65.29; 701/22, 93; 477/3, 107; 903/940, 910
See application file for complete search history.

(56) References Cited

U.S. PATENT DOCUMENTS

| | | | |
|---|---|---|---|
| 6,490,511 B1 * | 12/2002 | Raftari et al. ............. 701/22 |
| 6,694,232 B2 * | 2/2004 | Saito et al. ............. 701/22 |
| 7,104,347 B2 * | 9/2006 | Severinsky et al. ......... 180/65.2 |
| 7,197,390 B2 * | 3/2007 | Yuan et al. ............. 701/22 |
| 7,237,634 B2 * | 7/2007 | Severinsky et al. ......... 180/65.2 |
| 7,373,933 B2 * | 5/2008 | Kamada et al. ............ 180/65.2 |
| 7,392,871 B2 * | 7/2008 | Severinsky et al. ......... 180/65.2 |
| 7,396,316 B2 * | 7/2008 | Tabata et al. ............. 477/107 |
| 7,445,578 B2 * | 11/2008 | Tabata et al. ............. 477/3 |
| 2003/0236599 A1 * | 12/2003 | Saito et al. ............. 701/22 |
| 2005/0056475 A1 | 3/2005 | Roberts |
| 2008/0042489 A1 * | 2/2008 | Lewis et al. ............. 303/152 |
| 2008/0125928 A1 * | 5/2008 | Conlon et al. ............. 701/22 |
| 2008/0314661 A1 * | 12/2008 | Soliman et al. ............ 180/65.4 |

* cited by examiner

*Primary Examiner*—Hau V Phan

(57) ABSTRACT

A method of applying regenerative braking on a hybrid vehicle may include operating the hybrid vehicle in a cruise control mode to maintain a desired vehicle speed, determining whether an actual vehicle speed is greater than the desired vehicle speed, and braking the hybrid vehicle using a regenerative brake system. The braking may be applied during operation in the cruise control mode when the actual vehicle speed is determined to be greater than the desired vehicle speed to charge a battery system that powers an electric drive motor of the hybrid vehicle.

20 Claims, 4 Drawing Sheets ated with engine 22. Intake system 24 may include an intake manifold
CONTROL OF HYBRID POWER REGENERATION DURING CRUISE CONTROL

FIELD

The present disclosure relates to hybrid vehicles, and more specifically to regenerative brake systems for hybrid vehicles.

BACKGROUND

The statements in this section merely provide background information related to the present disclosure and may not constitute prior art.

Electric hybrid vehicles may include an internal combustion engine and an electric drive motor. The electric motor draws current from a battery and may drive the vehicle alone or in combination with the internal combustion engine. During braking, the electric motor may operate as a generator and may assist braking by operating in a regenerative braking mode, where the electric motor absorbs kinetic energy of the vehicle to brake the vehicle.

Many vehicles are equipped with cruise or speed control devices to maintain vehicle speed without the operator having to depress the accelerator pedal. Presently, vehicle speed is maintained by throttle control. However, a vehicle descending a grade may exceed the target speed regardless of the throttle position being closed.

SUMMARY

Accordingly, a method of applying regenerative braking on a hybrid vehicle may include operating the hybrid vehicle in a cruise control mode to maintain a desired vehicle speed, determining whether an actual vehicle speed is greater than the desired vehicle speed, and braking the hybrid vehicle using a regenerative brake system. The braking may be applied during operation in the cruise control mode when the actual vehicle speed is determined to be greater than the desired vehicle speed to charge a battery system that powers an electric drive motor of the hybrid vehicle.

The method may further include applying the braking when the hybrid vehicle is being driven by gravity.

The hybrid vehicle may include a control module including an engine control module, a hybrid power control module, and a power system management module. The engine control module may control operation of a combustion engine of the hybrid vehicle. The hybrid power control module may control operation of a hybrid power system of the hybrid vehicle. The power system management module may be in communication with the engine control module and the hybrid power control module to control operation of the hybrid vehicle in a cruise control mode to maintain a desired vehicle speed. The power system management module may control operation of a regenerative brake system of the hybrid vehicle to selectively charge a battery of the hybrid power system during operation of the hybrid vehicle in the cruise control mode.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
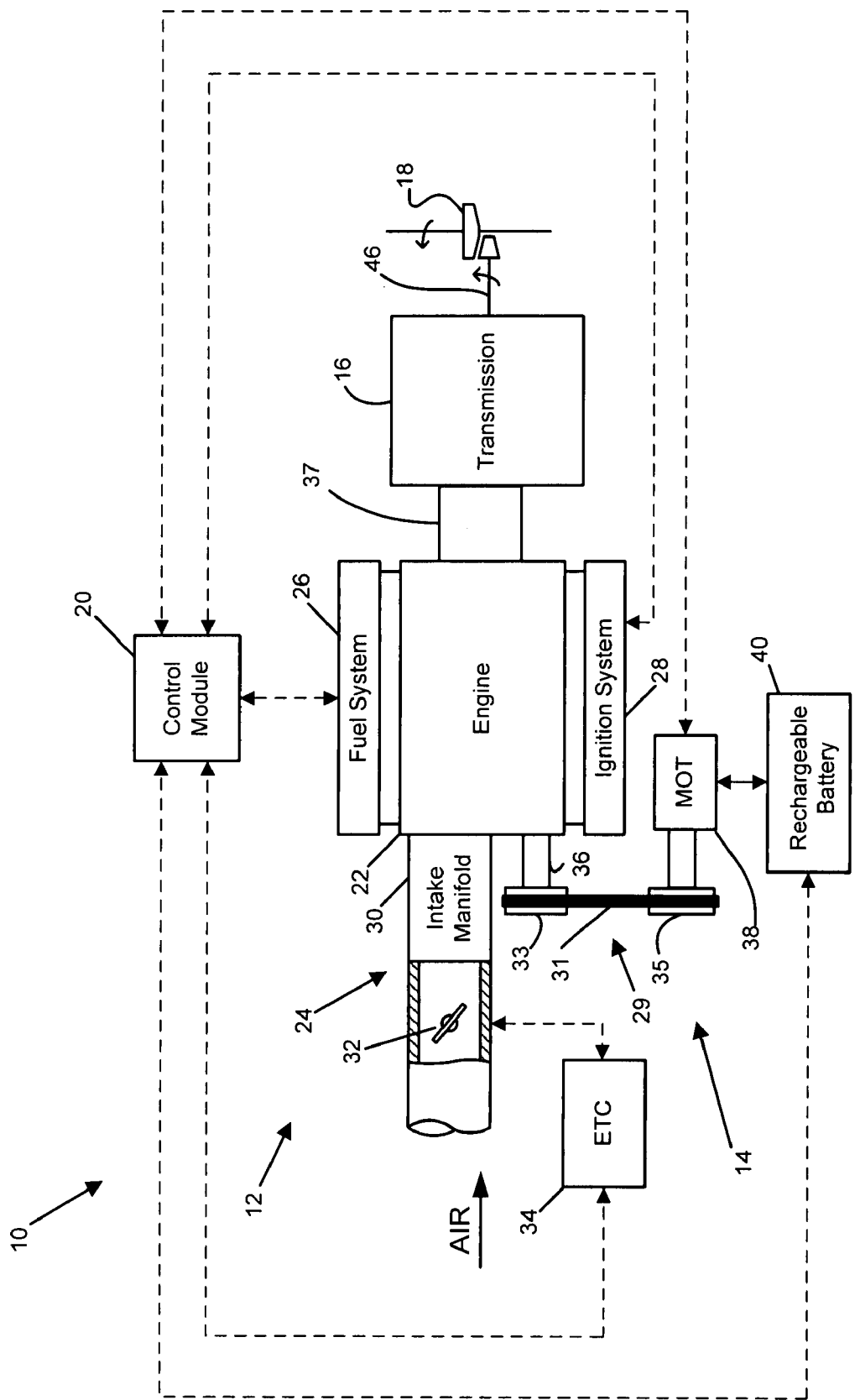
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary hybrid vehicle 10 is schematically illustrated. Vehicle 10 may include an engine assembly 12, a hybrid power assembly 14, a transmission 16, a drive axle 18, and a control module 20. Engine assembly 12 may include an internal combustion engine 22 in communication with an intake system 24, a fuel system 26, and an ignition system 28. Engine assembly 12 may further include a belt-alternator-starter (BAS) system 29 engaged with engine 22. Intake system 24 may include an intake manifold 30, a throttle 32, and an electronic throttle control (ETC) 34. ETC 34 may control throttle 32 to control an air flow into engine 22. Fuel system 26 may include fuel injectors (not shown) to control a fuel flow into engine 22 and ignition system 28 may ignite the air/fuel mixture provided to engine 22 by intake system 24 and fuel system 26. Engine 22 may include a crankshaft 36 engaged with BAS system 29.

Hybrid power assembly 14 may include an electric motor 38 and a rechargeable battery 40. Motor 38 may be in electrical communication with battery 40 to convert power from battery 40 to mechanical power. Motor 38 may additionally be operated as a generator to provide power to charge battery 40, as discussed below.

Engine 22 and motor 38 may be coupled via BAS system 29. More specifically, motor 38 may be coupled to engine 22 through a belt 31 and first and second pulleys 33, 35. First pulley 33 may be coupled for rotation with crankshaft 36 and second pulley 35 may be coupled to motor 38. First and second pulleys 33, 35 may be coupled for rotation with one another via belt 31. Second pulley 35 may be driven by engine 22, and more specifically crankshaft 36, during normal operation, operating motor 38 as a generator to charge battery 40. Alternatively, motor 38 may assist in powering rotation of crankshaft 36.

Engine assembly 12 may drive transmission 16. Engine 22 may be coupled to transmission 16 via a coupling device 37. Coupling device 37 may include a friction clutch or a torque converter. Transmission 16 may use the power provided from engine 22 and/or motor 38 to drive an output shaft 46 and power rotation of drive axle 18. Alternatively, rotation of drive axle 18 may be used to power rotation of crankshaft 36 and to drive motor 38 for recharging of battery 40.

Figure 2:
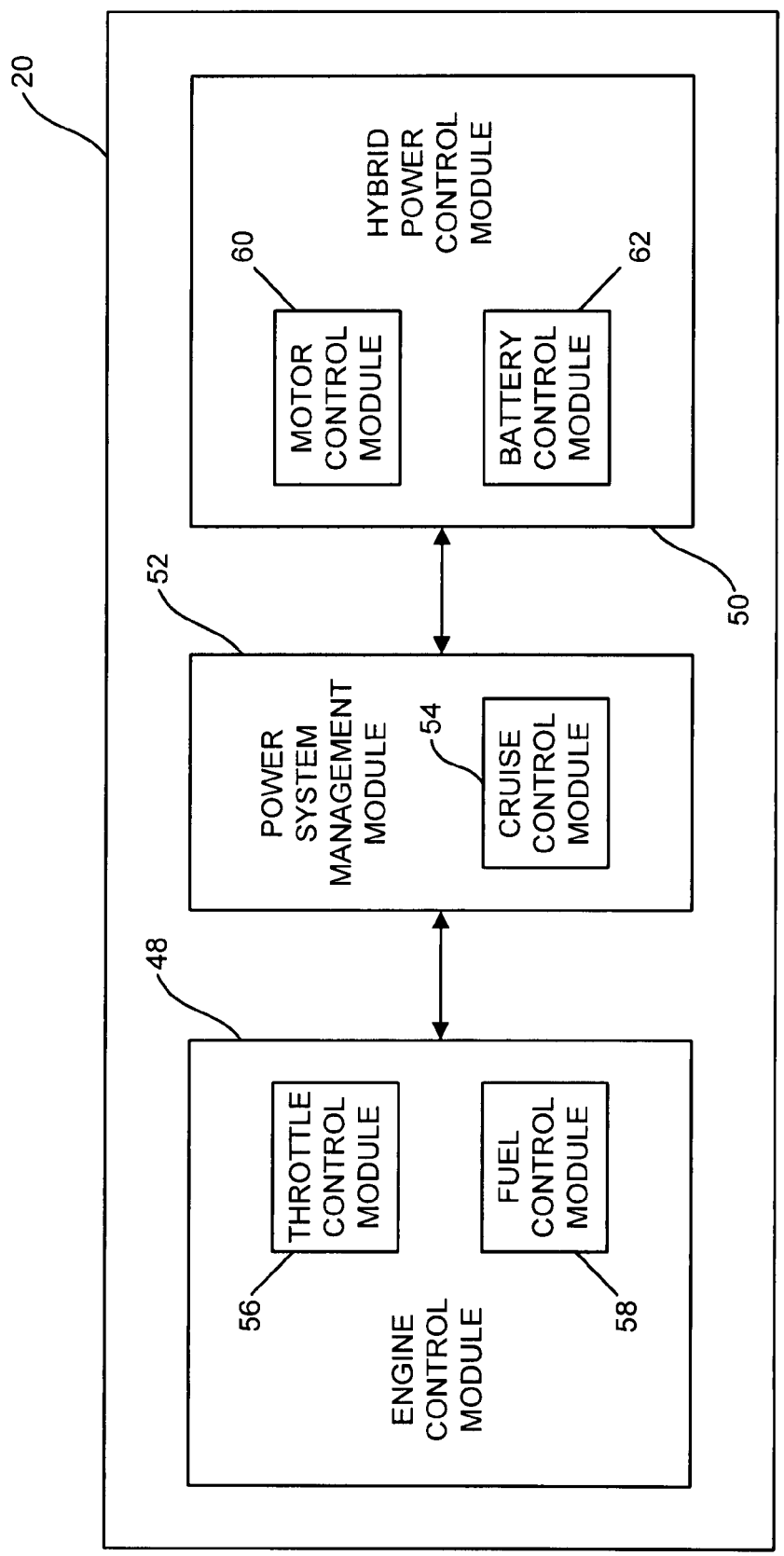
FIG. 2 is a control block diagram of the control module shown in FIG. 1.

Control module 20 may be in communication with fuel system 26, ignition system 28, ETC 34, motor 38, and battery 40. Referring to FIG. 2, control module 20 may include an engine control module 48, a hybrid power control module 50, and a power system management module 52. Engine control module 48 and hybrid power control module 50 may be in communication with power system management module 52. Power system management module 52 may control operation of engine 22 and motor 38 using engine control module 48 and hybrid power control module 50. Power system management module 52 may further include a cruise control module 54 to control a speed of vehicle 10 based on a desired speed during operation of vehicle 10 in a cruise control mode.

Engine control module 48 may generally control operation of engine 22 and may include a throttle control module 56 and a fuel control module 58. More specifically, engine control module 48 may increase, reduce, or terminate a power supplied by engine 22. Throttle control module 56 may adjust the position of throttle 32 between a fully open position and a closed position, including any intermediate position therebetween, using ETC 34. Fuel control module 58 may control fuel system 26, and fuel injectors associated therewith, to control a fuel supply to engine 22. Fuel control module 58 may adjust an amount of fuel delivered to engine 22 during a fuel system "on" condition to provide a desired amount of fuel for engine operation and may prevent delivery of fuel during a fuel system "off" condition, where fuel system 26, and fuel injectors associated therewith, are disabled.

Hybrid power control module 50 may generally control operation of hybrid power assembly 14 and may include a motor control module 60 and a battery control module 62. More specifically, hybrid power control module 50 may increase, reduce, or terminate a power supplied by hybrid power assembly 14. Motor control module 60 may control operation of motor 38 and battery control module 62 may monitor an operating state and charge level of battery 40.

Figure 3:
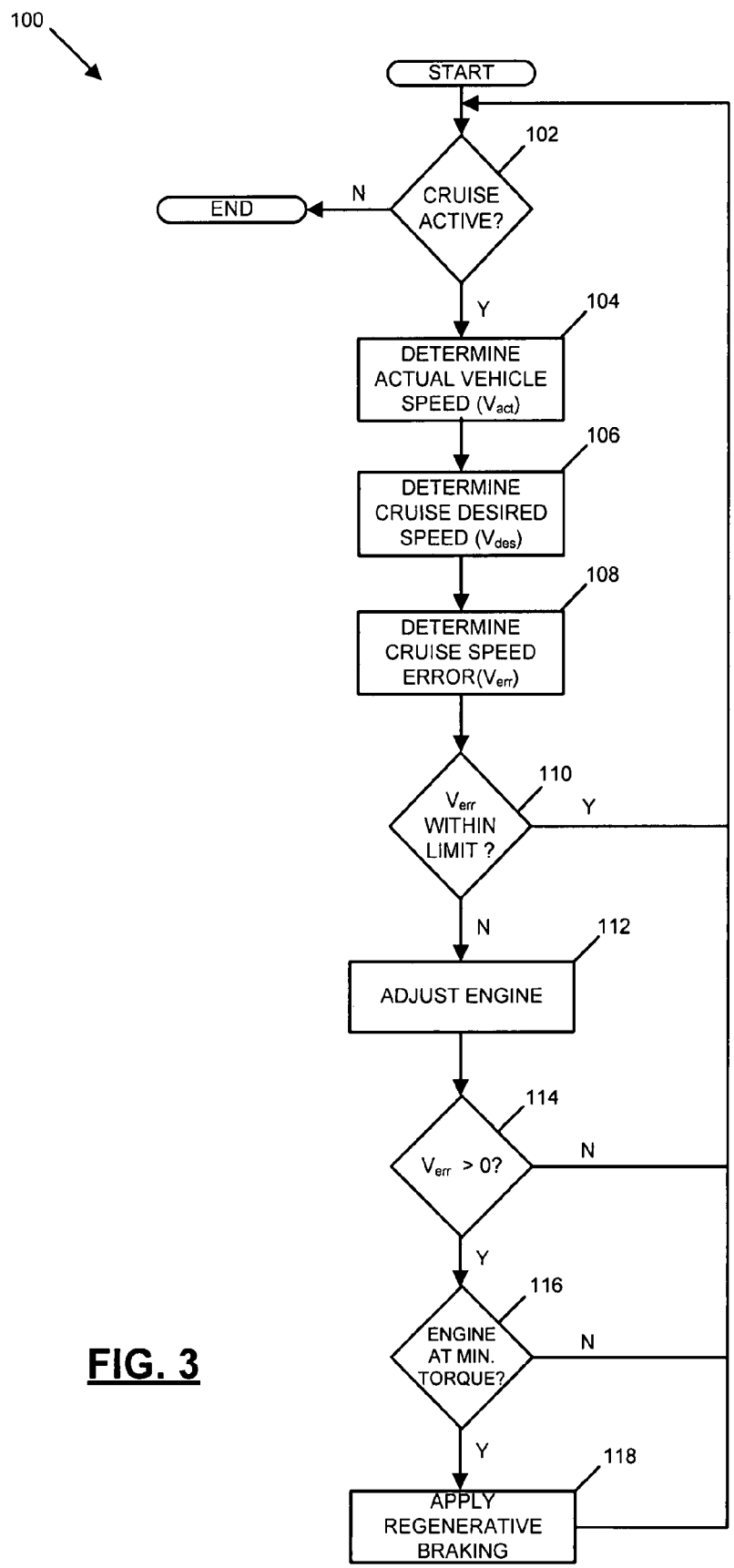
FIG. 3 is a flow diagram illustrating steps for control of hybrid power regeneration during cruise control operation.

FIG. 3 depicts a control logic 100 associated with control module 20 for regeneration of battery 40 during operation of vehicle 10 in a cruise control mode. Control logic 100 may begin at decision block 102 where a cruise control operating state is evaluated by cruise control module 54. If cruise control is not active, control logic 100 may terminate. If cruise control is active, control logic 100 may proceed to determination block 104.

Cruise control module 54 may determine an actual vehicle speed ($V_{act}$) at determination block 104. Control logic 100 may then proceed to determination block 106 where cruise control module 54 may determine a desired cruise speed ($V_{des}$). Once actual vehicle speed ($V_{act}$) and desired cruise speed ($V_{des}$) are determined, control logic 100 may proceed to determination block 108. Cruise control module 54 may determine a cruise speed error ($V_{err}$) at determination block 108.

The speed error ($V_{err}$) may generally be determined by: $V_{err}=V_{act}-V_{des}$. Speed error ($V_{err}$) is evaluated at decision block 110 by cruise control module 54. More specifically, decision block 110 determines if speed error ($V_{err}$) is within a predetermined limit. If speed error ($V_{err}$) is within the predetermined limit, control logic 100 may return to decision block 102. If speed error ($V_{err}$) is outside of the predetermined limit, control logic 100 may proceed to control block 112.

Control block 112 may adjust engine assembly 12 to meet or maintain desired cruise speed ($V_{des}$) using engine control module 48. Adjustment of engine assembly 12 may include adjusting an opening of throttle 32 with throttle control module 56 and an amount of fuel delivered to engine 22 by fuel system 26 using fuel control module 58. Control logic 100 may then proceed to decision block 114 where speed error ($V_{err}$) is again evaluated by cruise control module 54. Decision block 114 may generally determine if vehicle 10 is operating at an overspeed condition. If speed error ($V_{err}$) is greater than zero, vehicle 10 is operating at an overspeed condition and control logic 100 may proceed to decision block 116. If speed error is less than or equal to zero, control logic 100 may return to decision block 102.

Decision block 116 may evaluate a torque output from engine assembly 12 using engine control module 48. If engine assembly 12 is not operating at a minimum torque level, control logic 100 may return to decision block 102. If engine assembly 12 is operating at a minimum torque level, control logic 100 may proceed to control block 118. Operation of engine assembly 12 at a minimum torque level may include throttle 32 being in a closed position and fuel system 26, and fuel injectors, being in an "off" condition.

Control block 118 may apply regenerative braking to vehicle 10 using hybrid power control module 50. Application of regenerative braking may generally include referencing a look-up table that is a function of desired cruise speed ($V_{des}$) and speed error ($V_{err}$). Cruise control module 54 may schedule regenerative braking based on the look-up table. Control logic 100 may then return to decision block 102.

Figure 4:
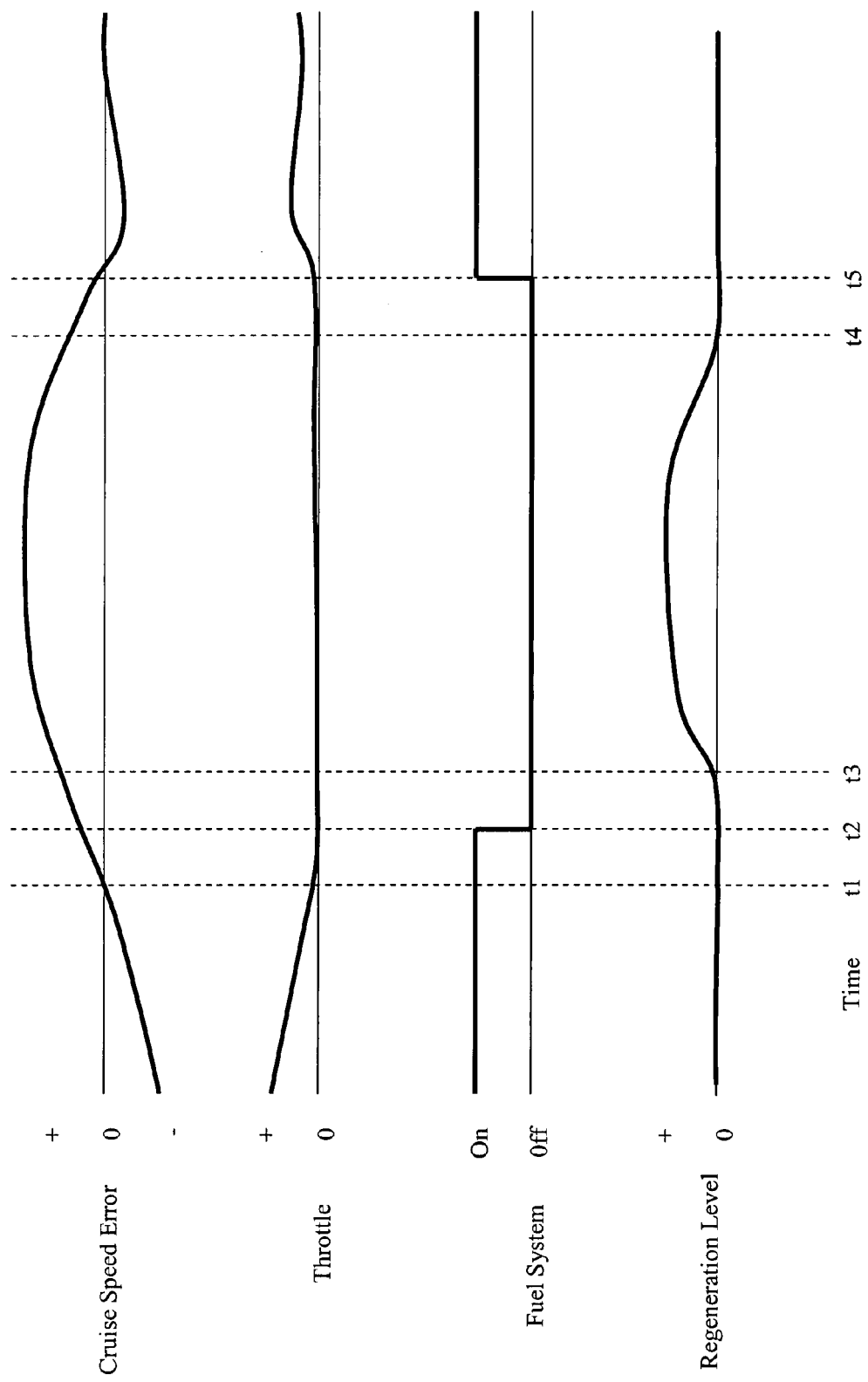
FIG. 4 is a graphical illustration of the control of hybrid power regeneration during cruise control operation of FIG. 3.

With reference to FIG. 4, operation of vehicle 10 during a cruise control mode is graphically illustrated. At a time before t1, vehicle 10 may be operating at an underspeed condition, where speed error ($V_{err}$) is less than zero. During the underspeed condition, throttle 32 may be at least partially open and fuel system 26 may be in an "on" condition. A regeneration level of battery 40 may be generally equal to zero.

At time t1, speed error ($V_{err}$) may be approximately zero and may be greater than zero (overspeed condition) after time t1. From time t1 to time t2, speed error ($V_{err}$) may be increasing and throttle 32 may approach a closed position. A regeneration level of battery 40 may remain generally equal to zero.

At time t2, speed error ($V_{err}$) may exceed a predetermined limit (as discussed regarding decision block 110). Throttle 32 may therefore be in a closed position at time t2 and fuel system 26, and fuel injectors, may be in an "off" condition. As such, engine assembly 12 may be at a minimum torque condition. Since engine assembly 12 is operating at a minimum torque level and speed error ($V_{err}$) is both greater than zero and outside of the predetermined limit, regenerative braking may be applied at time t3 to produce a regeneration level greater than zero of battery 40. Speed error ($V_{err}$) may be increasing when regenerative braking begins at time t3. Speed error ($V_{err}$) may be increasing due to vehicle 10 traveling on a downward slope and being driven by gravity. An increase in speed error ($V_{err}$) may generally correspond to an increase in actual vehicle speed ($V_{act}$). The regeneration level may continue to be greater than zero until a speed error is within the predetermined limit at time t4. Throttle 32 and fuel system 26 may then be adjusted at time t5 to maintain a desired vehicle speed.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A method, comprising:
operating a hybrid vehicle in a cruise control mode to maintain a desired vehicle speed;
determining whether an actual vehicle speed is greater than the desired vehicle speed; and
braking the hybrid vehicle using a regenerative brake system during operation in the cruise control mode to maintain the desired speed when the actual vehicle speed is determined to be greater than the desired vehicle speed to charge a battery system that powers an electric drive motor of the hybrid vehicle.

2. The method of claim 1 further comprising reducing a power output of a combustion engine of the hybrid vehicle when the actual vehicle speed is greater than the desired vehicle speed.

3. The method of claim 2 wherein the reducing includes reducing the power output of the engine to a minimum level.

4. The method of claim 2 wherein the reducing occurs before the braking.

5. The method of claim 1 further comprising determining an error between the actual vehicle speed and the desired vehicle speed, the braking occurring when the error is outside of a predetermined limit.

6. The method of claim 5 further comprising determining a power output of a combustion engine of the hybrid vehicle.

7. The method of claim 6 wherein the braking occurs when the power output of the combustion engine is at a minimum level.

8. The method of claim 1 further comprising referencing a look-up table to determine a magnitude of the braking.

9. The method of claim 8 wherein the duration of braking is based on the desired vehicle speed and an error between the actual vehicle speed and the desired vehicle speed.

10. The method of claim 1 wherein the braking occurs when the actual vehicle speed is increasing and a combustion engine of the hybrid vehicle is in a non-operating state.

11. The method of claim 10 wherein the braking occurs when an error between the actual vehicle speed and the desired vehicle speed is increasing.

12. The method of claim 1 wherein the braking occurs when the hybrid vehicle is being driven by gravity.

13. A method, comprising:
 operating a hybrid vehicle in a cruise control mode to maintain a desired vehicle speed;
 determining when a vehicle speed is increasing due to a gravitational force; and
 braking the hybrid vehicle using a regenerative brake system to maintain the desired speed during operation in the cruise control mode when the vehicle speed is determined to be increasing due to the gravitational force to charge a battery system that powers an electric drive motor of the hybrid vehicle.

14. A control module, comprising:
 an engine control module to control operation of a combustion engine of a hybrid vehicle;
 a hybrid power control module to control operation of a hybrid power system of the hybrid vehicle; and
 a power system management module in communication with said engine control module and said hybrid power control module to control operation of the hybrid vehicle in a cruise control mode to maintain a desired vehicle speed, said power system management module controlling operation of a regenerative brake system of the hybrid vehicle to brake the vehicle when an operating speed of the vehicle is greater than the desired speed to maintain the desired speed and selectively charge a battery of the hybrid power system during operation of the hybrid vehicle in the cruise control mode.

15. The control module of claim 14 wherein said power system management module commands a reduction in driving power for the hybrid vehicle when the hybrid vehicle is operating at a vehicle speed greater than the desired vehicle speed.

16. The control module of claim 15 wherein said engine control module reduces a power output from the combustion engine when said power system management module commands the reduction in driving power.

17. The control module of claim 14 wherein said power system management module evaluates an error between the desired vehicle speed and the operating vehicle speed.

18. The control module of claim 17 wherein said power system management module commands regenerative braking of the hybrid vehicle when the operating vehicle speed is greater than the desired vehicle speed and the error is outside of a predetermined limit.

19. The control module of claim 18 wherein said engine control module determines whether the combustion engine is operating at a minimum power level and said power system management module commands regenerative braking of the hybrid vehicle when the combustion engine is operating at the minimum power level.

20. The control module of claim 14 wherein said power system management module commands braking by the regenerative brake system when the hybrid vehicle is being driven by a gravitational force.

* * * * *